United States Patent
Yoo

[15] 3,671,565

[45] June 20, 1972

[54] PROCESS FOR HYDROGENATING ACRYLONITRILE TO PROPIONITRILE

[72] Inventor: Jin Sun Yoo, South Holland, Ill.

[73] Assignee: Atlantic Richfield Company, New York, N.Y.

[22] Filed: Jan. 16, 1970

[21] Appl. No.: 3,519

[52] U.S. Cl. ..................................260/465.1, 260/465.8 D
[51] Int. Cl. .......................................................C07c 121/16
[58] Field of Search...............................................260/465.1

[56] References Cited

UNITED STATES PATENTS 3,078,297   2/1963   Smeykal et al......................260/465.1
3,453,314   7/1969   Smeykal et al......................260/465.1

*Primary Examiner*—J. P. Brust
*Attorney*—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland

[57] ABSTRACT

The hydrogenation of acrylonitrile to propionitrile is disclosed using a catalyst having a complex of (A) nickel, and (B) an organometallic reducing agent on (C) an acidic, silica-based support material. The complex has a molar ratio of (B) to (A) of about 2:1 to 50:1 or more, preferably about 3:1 to 20:1, and with (A) being a minor catalytic amount, e.g. from about 0.1 to 5 weight percent, based on the support. Preferred catalyst components include nickel acetylacetonate and diisobutylaluminum hydride on a solid, acidic silica-based support.

10 Claims, No Drawings

PROCESS FOR HYDROGENATING ACRYLONITRILE TO PROPIONITRILE

This invention relates to the hydrogenation of acrylonitrile. In particular, this invention relates to a process for the hydrogenation of acrylonitrile to propionitrile in the presence of a particular catalyst.

The binary, homogeneous catalyst system of a nickel source and an organometallic reducing agent is known to be an effective catalyst for the hydrogenation of olefins. However, with acrylonitrile as the feed, the catalyst promoted polymerization selectively to polyacrylonitrile without the acrylonitrile being hydrogenated.

It has now been found that complexes of nickel with an organometallic reducing agent capable of reducing nickel acetylacetonate to an oxidation state of less than 2, on a solid, acidic silica-based support provide a catalyst composition having highly desirable physical and chemical characteristics, and particularly, excellent catalyst activity and selectivity for the hydrogenation of acrylonitrile to propionitrile, in the presence or absence of an inert solvent. The catalyst complex has a molar ratio of reducing agent to nickel of about 2:1 to 50:1 or more, preferably about 3:1 to 20:1. The nickel and reducing agent are provided in a minor amount effective to catalyze the hydrogenation reaction. The nickel can be present, for example, in an amount of from about 0.1 to 5 weight percent of the base, preferably from about 0.1 to 1 weight percent of the base.

In the preparation of the catalyst composition used in the process of the present invention, the nickel source is provided by compounds of the metal which are at least slightly soluble in some solvent wherein the nickel-reducing agent complex can be formed. Suitable sources of the nickel can include, for example, halides, e.g. $NiCl_2$, $NiBr_2$, $NiI_2$; dihydrocarbyloxy nickel, i.e., $Ni(OR)_2$, where R represents alkyl, aryl, aralkyl, and the like groups; dihydrocarbyloxy nickel carboxylate, i.e., $(RO)_2NiOOCR'$ where R and R' are as defined above as R; diphosphine complexes, e.g. $Ni[(C_6H_5)_2PC_2H_4P(C_6H_5)_2]X_2$, where X is a halide. Also available as nickel sources are chelates formed by the nickel and weak field ligands, such as $\beta$-diketones of $\beta$-keto-carboxylic acid esters and salts of carboxylic acids. Examples of these types of nickel sources include $\beta$-diketonato nickel (II), acetylacetonato nickel (II), propylacetonato nickel (II), benzoylacetonato nickel; chelates from $\beta$-ketocarboxylic acid esters; salts of saturated monocarboxylic acids, e.g. nickel formate, nickel propionate, nickel caproate, nickel octoate, nickel palmitate, nickel stearate, and the like; salts of corresponding unsaturated monocarboxylic acids, e.g. nickel acrylate, nickel vinyl acetate, and the like; salts of saturated dicarboxylic acids, e.g. nickel adipate, nickel decane-1,10-dicarboxylate, and the like; salts of corresponding unsaturated dicarboxylic acids, e.g., nickel muconate and the like; salts of cyclic and aromatic carboxylic acids, e.g., nickel cyclohexane carboxylate, nickel benzoate, nickel phthalates, nickel phenylacetate and the like; and dialkoxycarboxylates, e.g. nickel dimethoxyacetate and the like. Preferred as a source of nickel is nickel acetylacetonate.

As examples of reducing agents in this catalyst, there may be mentioned the non-halogen containing organometallic and organometallic hydride compounds which correspond to the general formulas:

wherein M is a metallic element of coordination number $n$, H is hydrogen, R' is hydrocarbyl, e.g. alkyl or aryl, of two to about 15 carbon atoms and $y$ is a number having a value from 0 to $n$; preferably $y$ is at least 1 less than $n$ so that R' is at least 1. Preferred metallic elements in the above compound include aluminum, magnesium, beryllium, lead, zinc, and tin. Aluminum is preferred. Examples of suitable compounds are triisobutyl aluminum, di-isobutyl aluminum hydride, triethylaluminum, tripropylaluminum, diethyl aluminum hydride, the corresponding compounds of the other metals designated by M, etc. The reducing agent must be capable of reducing nickel acetylacetonate, preferably to an oxidation state lower than 2 and even to 0.

A solid support suitable for use in the catalyst of the present invention is an acidic, silica-based material e.g. having a D + L activity of at least about 20, preferably at least about 30 when determined according to the method of Birkhimer et al., "A Bench Scale Test Method for Evaluating Cracking Catalysts," Proceedings of the American Petroleum Institute, Division of Refining, Vol. 27(III), page 90 (1947) and hereinafter referred to as Cat A. The silica-based support preferably has a substantial surface area as determined by the BET nitrogen absorption procedure (JACS, Vol. 60, pp. 309 et seq. (1938). The surface area of the support can be at least about 50 square meters per gram, and such surface areas are often up to about 500 or more $m^2/gm$, preferably about 150 to 400 $m^2/gm$. It is preferred that the catalyst support be relatively dry to avoid undue reaction with and loss of catalytic promoting materials. Thus, it is advantageous that the support be calcined, e.g. at temperatures of about 600° to 1,500°F., or more, to reduce the water content, but such calcination should not be so severe that the support is no longer catalytically-active.

The support component can contain other materials in addition to silica which materials, when combined with silica, provide an acidic material as in, for instance, the case of silica-alumina. Often these materials are one or more oxides of the metals of groups II, III and IV of the periodic table. Examples of the composites contemplated herein under the generic designation of silica-based materials are often composed predominantly of or even to a major extent of silica. These supports include, for example, silica-alumina, silica-boria, silica-zirconia, silica-magnesia, silica-alumina-zirconia, silica-alumina-thoria, silica-alumina-magnesia, and the like. The silica-based support can contain amorphous or crystalline material such as a crystalline aluminosilicate, for instance, having pore openings with diameters in the 6 to 15 angstrom unit range. The support often contains silica and alumina and such supports, whether naturally-occurring as in acid-treated clays, or a synthetic gel, will frequently contain about 10 to 60, preferably about 15 to 45, weight percent alumina. In addition, such silicaalumina supports can, and preferably do, contain a portion of the alumina as a separate, distinct phase.

A highly preferred catalyst support can be made by combining a silica-alumina hydrogel with a hydrous alumina with or without (preferably without) a crystalline aluminosilicate. An advantageous hydrous alumina component is, when analyzed by X-ray diffraction of dry samples, either one or a mixture of amorphous hydrous alumina and a monohydrate, e.g., boehmite, of less than about 50 A, preferably less than about 40 A, crystallite size as determined by half-width measurements of the (0, 4, 1) X-ray diffraction line calculated by the Debye-Scherrer equation. The mixture of the catalyst precursor components can be dried, e.g., at about 220° to 500°F., to convert the silica-alumina hydrogel to xerogel form. The dried material can then be calcined, e.g., at a temperature of about 700° to 1,500°F., preferably about 800° to 1,400°F., to provide the active catalyst support. During calcination, the separate hydrous alumina phase of the mixture is converted to a gamma form or other catalytically-active alumina.

In providing the preferred catalyst support precursor for drying, the components can be combined in any suitable manner or order desired, and advantageously each of the components is in the mixture in finely-divided form, preferably the particles are principally less than about 300 mesh in size. The finely-divided material can have an average particle size of about 10 to 150 microns and can be used to make a catalyst of this particle size which can be employed in a fluidized bed type of operation. However, if desired, the mixture of catalyst support components can be placed in macrosized form, that is, made into particles as by tabletting, extruding, etc., to sizes of the order of about 1/64 to ½ in. or more in diameter and about 1/32 to 1 in. or more in length, before or after drying or calcination. If formation of the macrosized particles is subsequent to calcination and the calcined particles have been contacted with water, the material can be recalcined.

On a dry basis, the preferred supports of the catalysts of the present invention contain about 45 to 95 weight percent of the amorphous silica-alumina xerogel, about 5 to 55 weight percent of the separately added alumina phase, and about 0 to 50 weight percent of the crystalline aluminosilicate, preferably the proportions of these ingredients are about 75 to 90 percent, about 10 to 25 percent and about 0 to 20 percent, respectively. If present, the crystalline aluminosilicate is usually at least about 1 weight percent, preferably at least about 5 weight percent, based on the dried support. The alumina content from the silica-alumina xerogel and the separate alumina phase is about 20 to 70 weight percent, preferably about 25 to 60 weight percent, based on the dried support. Also, the catalyst support generally contains less than about 1.5 weight percent, preferably less than about 0.5 weight percent, sodium.

The silica-alumina component of the precursor of the preferred catalyst support of the present invention can be silica-alumina hydrogel which contains about 55 to 90, preferably 65 to 75, weight percent silica and about 10 to 45, preferably about 25 to 35, weight percent alumina, on a dry basis. The silica-alumina can be naturally-occurring or can be synthetically prepared by any desired method and several procedures are known in the art. For instance, an amorphous silica-alumina hydrogel can be prepared by co-precipitation or sequential precipitation by either component being the initial material with at least the principal part of the silica or alumina being made in the presence of the other. Generally, the alumina is precipitated in the presence of a silica gel. It is preferred that the silica-alumina hydrogel be made by forming a silica hydrogel by precipitation from an alkali metal silicate solution and an acid such as sulfuric acid. Then alum solution may be added to the silica hydrogel slurry. The alumina is then precipitated by raising the pH into the alkaline range by the addition of an aqueous sodium aluminate solution or by the addition of a base such as ammonium hydroxide. Other techniques for preparing the silica-alumina hydrogen are well known in the art, and these techniques may be used in the practice of the invention.

The alumina hydrogel which can be combined with the silica-alumina is made separately from the silica-alumina. The alumina hydrogel may be prepared, for example, by precipitation of alumina at alkaline pH by mixing alum with sodium aluminate in an aqueous solution or with a base such as soda ash, ammonia, etc. As noted above, the alumina hydrogel can be in the form of amorphous hydrous alumina or alumina monohydrate, e.g., of up to about 50 A crystallite size as determined by X-ray diffraction analysis. The amorphous hydrous alumina generally contains as much combined water as does an alumina monohydrate. Mixtures of the monohydrate and amorphous forms of hydrous alumina are preferred and often, this phase is composed of at least about 25 percent of each of the separate members.

In preparing the catalyst support, one may separately filter the silica-alumina hydrogel and the hydrous alumina and intimately mix these materials, for instance, by colloidal milling. Although in this particular procedure a low sodium crystalline aluminosilicate can be added after the milling, this ingredient can also be combined before the colloidal milling operation. The mixture is dried, water washed to acceptable concentrations of, for instance, sodium, and redried in the preferred procedure. The drying, especially the initial drying, is advantageously effected by spray drying to give microspheres.

The crystalline aluminosilicate which can be present in catalyst support of the present invention, can have pore openings of 6 to 15 A, in diameter and preferably the pore openings have a diameter of 10 to 14 A. Usually, with a given material, the pores are relatively uniform in size and often the crystalline aluminosilicate particles are primarily less than about 15 microns in size, preferably less than about 10 microns. In the crystalline aluminosilicate the silica-to-alumina mole ratio is often greater than about 2:1 and is usually not above about 12:1, preferably being about 4 to 6:1. The aluminosilicate may be available in the sodium form, and the sodium can be removed before or after the crystalline aluminosilicate is added to the other catalyst support ingredients.

It is preferred to exchange the sodium with ammonium ions, for instance, through contact with an aqueous solution of ammonium chloride or another water-soluble ammonium compound. Subsequently, during drying and/or calcination, the ammonium ion may break down to release ammonia and leave an acid site on the aluminosilicate. On a molar basis, the ammonium or hydrogen ion is usually at least about 10 percent or even at least about 50 percent, based on the alumina content of the crystalline aluminosilicate. Suitable replacements for the sodium also include the polyvalent metals of the periodic chart, including the group II-a and rare earth metals such as cerium, etc. The metals may be present along with the ammonium or hydrogen cations.

The order in which components are combined to prepare the supported catalyst used in the present invention can be varied. The catalysts can be conveniently prepared by impregnating the silica-based support material with a solution of the nickel component, e.g., nickel acetylacetonate, in a solvent, e.g., methanol, forming light-green-colored pellets. The nickelimpregnated support after solvent removal is then contacted with a solution of the reducing agent component forming a black-colored catalyst system.

Although the foregoing is a preferred method for preparing the catalyst used in the process of this invention, the nickel complex can first be prepared for subsequent impregnation into the silica-based support. The preparation of the unsupported nickel complex can be conducted by forming the complex of the nickel source and then adding to a solution or suspension, of that complex, in a suitable organic solvent, the reducing agent. Suitable organic solvents are those which are inert to the catalyst and which will not enter into, or deleteriously affect, the eventual hydrogenation reaction. As specific examples thereof may be mentioned aromatic and aliphatic hydrocarbons and their halogenated, e.g., chlorinated, derivatives. Oxygen-containing solvents are generally to be avoided for this purpose.

Thus, for example, one method of preparing the nickel complex can involve stirring, preferably at room temperature, a mixture of nickel acetylacetonate and toluene. The reducing agent can be added directly. The addition to the solution of the reducing agent is preferably conducted in a dry-inert atmosphere, out of the presence of air or oxygen, for instance, in an autoclave. Within a relatively short period of time after the admixing of the components, e.g., about 5 to 15 minutes, the catalyst composition is formed, preferably as a colloidal precipitate suitable for impregnating the silica-based supports of this invention.

The catalyst composition, as described, may be used to catalyze the hydrogenation of acrylonitrile to propionitrile, in the presence or absence of an inert solvent, such as toluene or other hydrocarbon liquid. Hydrogenation can be affected by contacting the acrylonitrile in the presence of a catalytically-effective amount of the catalyst at a temperature of from about 75° to 250°F., preferably 100° to 200°F., and in the presence of molecular hydrogen in an amount sufficient for the hydrogenation of acrylonitrile to propionitrile. The hydrogen can be present at a pressure of from about 50 to 2,000 or more psig., preferably 250 to 1,500 psig. Generally, the higher the temperature, the lower the pressure that can be used. The amount of catalyst present can often be from about 0.5 to 100 weight percent, preferably 5 to 50 weight percent of catalyst composition based on the weight of the acrylonitrile feed. The catalyst system can also be utilized in a continuous reactor for the continuous hydrogenation of acrylonitrile.

The preparation of an acidic silica-alumina support is illustrated by examples I–III, and the support contains a separate phase of alumina.

EXAMPLE I

An alumina hydrogel is prepared as follows:

In a tank containing 5,700 gallons of water at 85°F., are dissolved 300 lbs. of soda ash. When the soda ash has been dissolved, 180 gallons of a 39 percent concentration aqueous sodium aluminate solution are pumped into the tank in about a 15-minute period. The contents of the tank are at about 84°F. Six-hundred gallons of aqueous aluminum sulfate of 7.8 percent concentration, as $Al_2O_3$, are added to the admixture over an 80-minute period with water of dilution in conjunction with, and in addition thereto, diluting the reaction mass at a rate of 25 gallons per minute.

The pH of the resulting aqueous reaction mass is adjusted to 8.0 with about 75 gallons of 39 percent concentration aqueous sodium aluminate solution which, while being added, is also diluted continuously with water at a rate of 35 gallons per minute over a 7½ minute addition period. The contents of the tank are heated to about 100°F., and pumped to storage.

The precipitated, hydrated alumina is thereafter filtered on a large gel filter. The filtered product is partially purified by a one-cycle, water-wash on the filter on which it is collected. This filter is a string vacuum type drum filter with a built-in water spray nozzle directed toward the filter drum. Material on the drum is contacted with water as the drum rotates past the nozzle. After washing, the wet alumina hydrogel is stripped from the drum. This hydrogel analyzes about 50 percent boehmite having a crystallite size of about 35 A, and 50 percent amorphous hydrous alumina as determined by X-ray diffraction on dried samples.

EXAMPLE II

A silica-alumina hydrogel is prepared by the following technique:

To a batch tank is added 4,275 gallons of water preheated to 90°F., and 865 gallons of sodium silicate solution (28.8 weight percent $SiO_2$, 40–41.5 Baume at 68°F., and $Na_2O:SiO_2$ ratio of 1:3.2) is added. The batch is stirred for 5 minutes. The concentration of the sodium silicate, as $SiO_2$, in the batch is 6.3 weight percent.

With the batch at 90°F., 302 gallons of 34.5 weight percent sulfuric acid solution at 182°F. are added over a period of 45 minutes. The gel forms about 35 minutes after acid addition is begun. The pH is adjusted to 8.0–8.5. The batch is agitated for 10 minutes.

Then 715 gallons of alum (7.8 weight percent, as $Al_2O_3$) is added to the gel over a period of about 36 minutes. The batch is agitated for an additional 5 minutes whereupon 205 gallons of sodium aluminate solution (24.4 weight percent as $Al_2O_3$) diluted in 1,080 gallons of water is added over a period of 17 minutes. After all the sodium aluminate is added, the pH is checked. It should be between 5.0 and 5.2. The alumina content of the silica-alumina hydrogel is 30–31 percent.

EXAMPLE III

The silica-alumina hydrogel product of example II and 1740 gallons of the alumina hydrogel filter cake of example I are mixed together for 1 hour. The finished batch has a pH of 5.5 to 5.6 and a temperature of about 110°F. The aqueous gel mixture is then pumped to a dewatering filter, and the filter cake from said dewatering filter and a portion of aqueous gel are blended to give a gel slurry of about 14 weight percent solids. A portion of this hydrogel mixture was slurried, as a thick flowable paste, with a "Lightnin" stirrer fitted with a cage-beater and a propellor, for about 10 minutes to give a thorough dispersion. The product was stirred 1 minute at 14,500 rpm., in a Waring Blender and dried in a laboratory spray-drier. The spray-dried material was washed with water to acceptable impurity levels and dried at 230°F. The washed and dried material analyzed 0.08 percent $SO_4$ and less than 25 ppm $Na_2O$. The dried material as such was used as the catalyst support, as were extruded forms thereof and tablets (pellets) having diameters of about ⅛ inch and lengths of about ⅛ to ½ inch. Before use, the catalyst support was calcined in a muffle furnace by raising the temperature by 300°F. per hour until 1,350°F. was reached. This temperature was then held for 3 hours. The calcined particles had a surface area of about 320 to 340 square meters per gram.

The preparation and utilization of the catalyst of the present invention are illustrated by the following examples. Details of reaction conditions, catalyst compositions, and product distribution for these examples are listed in tables I and II.

EXAMPLE IV

A 300 cc stainless steel autoclave equipped with a magnetic stirrer was used as a reactor. The black solid catalyst system prepared from both 1.2 m moles nickel acetylacetonate and 14.5 m moles diisobutylaluminum hydride were charged to the reactor along with 40 ml. toluene and 4.0 g pellets (⅛ in. diameter × ¼–1/16 in. length) of the solid, acidic support prepared in example III These components were allowed to react under 100 psig. hydrogen and at 100°–160°F. for 15 minutes. A slight excess of nickel not supported on the base was present. As soon as acrylonitrile (60 ml.) was introduced into the system, the system was pressured with hydrogen to 1,400 psig., and hydrogen uptake was measured. The initial pressure of the system (1,400 psig.) dropped to 600 psig. within 45 minutes, and then to 350 psig. after another 60-minute period. The black reaction mixture was discharged from the reactor, and was treated with dilute HCl to isolate an organic liquid portion and some polymer product from an aqueous layer. The organic liquid was again separated from the polymer product, and analyzed by mass spectroscopic and proton NMR techniques. The polymeric product, which dissolved only in dimethylsulfoxide, was precipitated by addition of a large excess of methanol. After this precipitated product was washed with pentane and ether, it was dried and identified by infrared spectroscopic study. Details of the results are listed in table I and II. About 74 mole percent of acrylonitrile was hydrogenated to propionitrile, and a very small portion of the acrylonitrile was converted to polymeric product.

EXAMPLE V

The previous run was repeated under similar conditions except that the system now described did not have the solid, acidic silica-based support pellets present as one of the catalyst components. After 40 ml of acrylonitrile was added to the black heterogeneous system containing 1.1 m moles nickel acetylacetonate, and 15.4 m moles diisobutyl aluminum hydride in 50 ml toluene, hydrogen was introduced to attain 1,200 psig. hydrogen pressure. No significant hydrogen uptake was observed for a 100 minute period. A dark-red reaction mixture was removed from the reactor, and the polymeric product was isolated and purified as previously described. The infra-red spectrum of this product proved to be identical with the known polyacrylonitrile product. In the catalyst system without the solid, acidic silica-based support component, acrylonitrile undergoes polymerization under a hydrogen atmosphere instead of being hydrogenated. Thus, judging from the results obtained from this and previous example, the solid, acidic silica-based support is an essential catalytic component for the hydrogenation. Furthermore, it is obvious that the nature of the catalytic species formed in the binary system containing nickel acetylacetonate and diisobutylaluminum hydride in toluene can be substantially changed with the solid, acidic silica-based support as an essential component for hydrogenation it also serves as an effective supporting base as well.

EXAMPLE VI

The black catalyst, prepared from 1.1 m moles nickel acetylacetonate and diisobutylaluminum hydride (14.5 m moles), was supported on 4.0 g pellets of the solid, acidic support prepared in example III. The resulting black supported catalyst was aged for about three hours by running the hydrogenation reaction with various unsaturated compounds such as heptene-3, cyclohexene, and 1,5-cyclooctadiene, in four consecutive runs before an acrylonitrile substrate was fed to the catalyst. A slight excess of nickel not supported on the base was present.

Acrylonitrile (40 ml) was injected to the aged catalyst, and the reactor was pressured with hydrogen to 1,200 psig. Hydrogen-uptake from 1,200 to 410 psig. reactor pressure was noticed over a 170 minute period. In this run, 87 mole percent of the acrylonitrile substrate was hydrogenated to propionitrile, and the polymeric product was obtained to only a very minor extent. This clearly demonstrates that the supported catalyst can be successfully used for hydrogenation of acrylonitrile in the absence of an inert solvent. It is natural to expect that the virgin supported catalyst will show a higher catalytic activity for hydrogenation of acrylonitrile to propionitrile than the aged catalyst used in the present run.

EXAMPLE VII

The black supported catalyst, prepared from 1.1 m moles nickel acetylacetonate, 15.8 m moles diisobutyl aluminum hydride and 4.0 g of the solid, acidic support prepared in example III was aged for 2½ hours through two consecutive hydrogenations using first 4-vinyl-1-cyclohexene and then styrene as the feed. A slight excess of nickel not supported on the base was present. To the resulting aged catalyst, 50 ml acrylonitrile was introduced and the pressure of the system raised to 1,100 psig. with hydrogen. A moderate hydrogen uptake from 1,100 to 500 psig. was observed within 120 minutes. About 49 mole percent of acrylonitrile was converted to propionitrile. No appreciable polymeric material was present in the product.

It is claimed:
1. In a process for hydrogenating acrylonitrile to propionitrile in the presence of hydrogen, the improvement which comprises conducting said hydrogenation in contact with the catalyst which consists essentially of a complex of
  A. nickel, and
  B. a reducing agent capable of reducing nickel acetylacetonate to an oxidation state of less than 2 having the formula $$R'_{(n-y)}MH_y$$

wherein M is an element selected from the group consisting of aluminum, magnesium, beryllium, lead, zinc, and tin having a coordination number $n$, R' is hydrocarbyl of two to about 15 carbon atoms selected from the group consisting of alkyl and aryl, and $y$ is 0 to $n$, with the proviso that there must be present at least one R' group, on a solid, acidic silica-based support, the molar ratio of B to A in the complex being about 2:1 to 50:1 and with (A) being a minor, catalytic amount based on the support.

2. The process of claim 1 wherein the hydrogenation is performed at a temperature of from about 75° to 250°F., and a pressure of from about 100 to 2,000 psig.

3. The process of claim 2 wherein the hydrogenation is performed at a temperature of from about 100° to 200°F., and a pressure of from about 250 to 1,500 psig.

4. The process of claim 1 wherein (B) is an organoaluminum hydride.

5. The process of claim 1 wherein the molar ratio of B to A is about 3:1 to 20:1 and (A) is from about 0.1 to 1 weight percent of the total catalyst.

6. The process of claim 5 wherein the nickel is provided as nickel acetylacetonate.

TABLE I

| Example number | Catalyst composition | | | | Reaction condition | | | |
|---|---|---|---|---|---|---|---|---|
| | Nickel acetylacetonate, mm. | Diisobutyl aluminum hydride, mm. | Pelletized support grains, g. | Toluene, mm. | Hour aged, hr. | Pressure, p.s.i.g. | Temperature, °F. | Reaction time, mins. |
| IV | 1.2 | 14.5 | 4.0 | 40 | | 1,400–350 | 154–194 | 105 |
| V | 1.1 | 15.4 | | 50 | | 1,200–1,180 | 150–184 | 100 |
| VI | 1.1 | 14.5 | 4.0 | | 3 | 1,200–410 | 123–183 | 170 |
| VII | 1.1 | 15.8 | 4.0 | | 2½ | 1,100–500 | 153–191 | 120 |

TABLE II

| | Analysis of product | | | |
|---|---|---|---|---|
| Example number | Acrylonitrile feed, ml. | Unreacted acrylonitrile, mole percent | Propionitrile, mole percent | Polymeric product |
| IV | 60 | 26.5 | 73.5 | Small amount. |
| V | 40 | | | Polymer only. |
| VI | 40 | 12.9 | 87.1 | Very small amount. |
| VII | 50 | 50.9 | 49.1 | None. |

7. The process of claim 6 wherein (B) is an organoaluminum hydride.

8. The process of claim 1 wherein the support is silica-alumina calcined at a temperature of from about 700° to 1,500°F.

9. The process of claim 8 wherein the support is comprised of about 45 to 95 weight percent amorphous silica-alumina, and about 5 to 55 weight percent alumina, the total alumina content of said support being about 20 to 70 weight percent.

10. The process of claim 9 wherein said alumina results from the calcination of a member selected from the group consisting of amorphous hydrous alumina, alumina monohydrate and mixtures thereof.

* * * * *